March 26, 1929.  E. W. CARUTHERS  1,707,048

RAIL JOINT

Filed Sept. 13, 1928   2 Sheets-Sheet 1

Inventor
Eugene W. Caruthers
by
Attorney

March 26, 1929.  E. W. CARUTHERS  1,707,048
RAIL JOINT
Filed Sept. 13, 1928  2 Sheets-Sheet 2
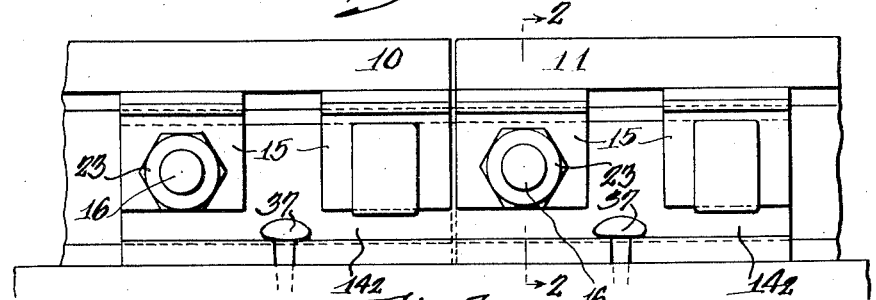
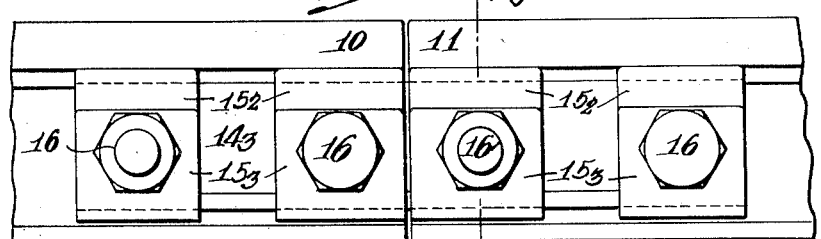
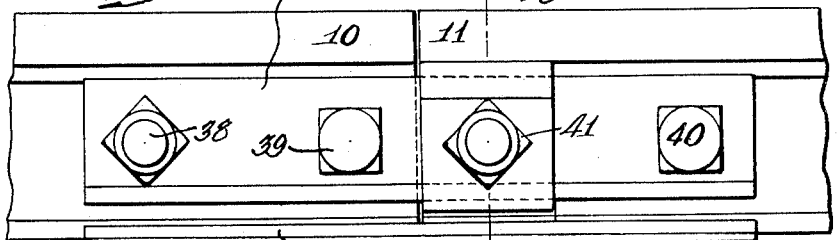
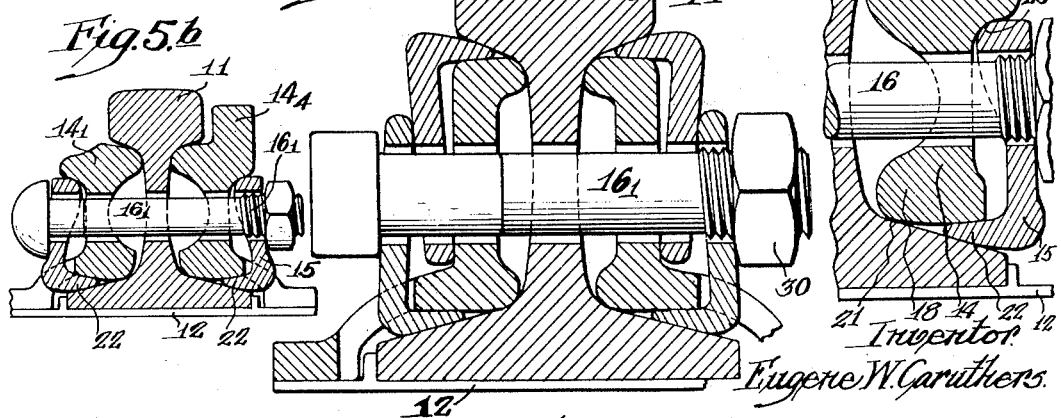
Inventor
Eugene W. Caruthers
by
Attorney Patented Mar. 26, 1929.

1,707,048

UNITED STATES PATENT OFFICE.

EUGENE W. CARUTHERS, OF SECANE, PENNSYLVANIA.

RAIL JOINT.

Application filed September 13, 1928. Serial No. 305,627.

My invention relates to splice bar joints between the rails of a railroad.

A purpose of my invention is to mount a wedge member between the opposing surfaces of one or both of the abutting rail ends of a rail joint and of a splice bar or both splice bars of the joint in order to secure a fastening between the rail ends which is more rigid transversely and particularly vertically. This prevents relative rail displacement in any and all directions.

A further purpose is to accommodate differences in the sectional contours of the abutting ends of rails within the joint by means of a wedge-dog member mounted upon a splice bar and one or more track bolts of the joint.

A further purpose is to secure a longer life for splice bars by providing an auxiliary take-up member mounted upon the bar and one or more of the track bolts to adjustably take up the wear between the splice bar and rail.

A further purpose is to prevent greater wear at one side of a rail joint during service than at the other side by making the supporting contacts of the splice bars equally good along both rail ends.

A further purpose is to provide adjustable wedge bearing support between the upper or/and lower portions of the splice bar of a rail joint and the corresponding rail surfaces.

Further purposes will appear in the specification and in the claims.

I have elected to show a few only of the many different forms of my invention, selecting forms that are practical and efficient in operation and which well illustrate the principles involved.

Figures 1, 2 and 3 are vertical sections upon the lines 1—1, 2—2 and 3—3 of Figures 4, 6 and 7 respectively and illustrate different desirable forms of my invention.

Figure 1ª is a section corresponding generally with Figure 1 but with a slightly different fit between the splice bar head and the rail head.

Figure 5:
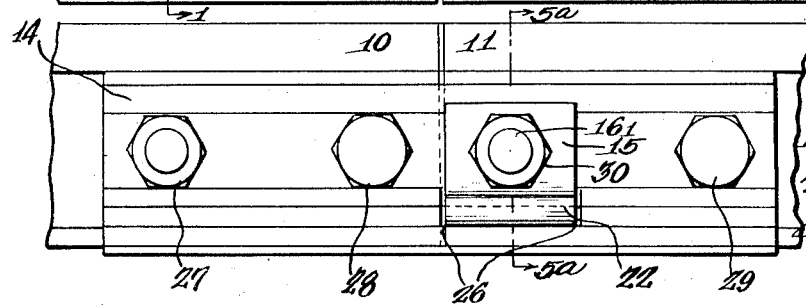

Figure 5ª is a section taken upon the line 5ª—5ª of Figure 5. Figure 5ᵇ is a similar view of a modification.

Figure 2:
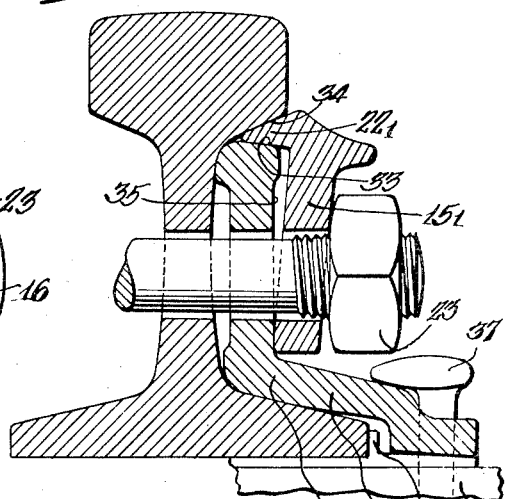

Figure 6 is a side elevation of Figure 2.

Figure 3:
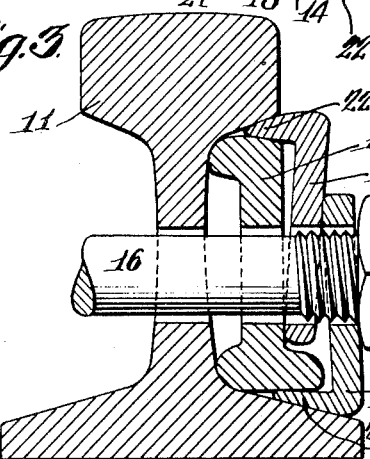
Figure 5A:
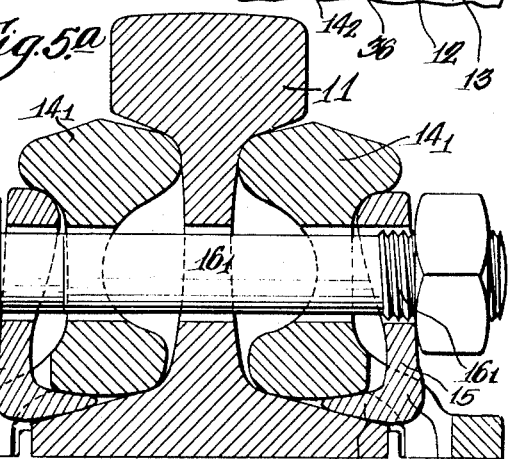
Figure 5 is a view generally similar to Figure 4 but of a slightly different form from that shown in Figure 4.

Figure 7 is a side elevation of Figure 3.

Figure 8 is a view generally similar to Figure 7 but of a somewhat different form.

Figure 8ª is a vertical section taken upon the line 8ª—8ª of Figure 8.

Like numerals refer to like parts in all figures.

Describing in illustration and not in limitation and referring to the drawings:—

In railroad practice the sectional contours of commercial rails vary more or less both with respect to different portions of the same rail and still more with respect to different rails, so that the sectional contours of the abutting rail ends of a rail joint are seldom identical.

As a result of this lack of uniformity of rail contour and of splice bar contour, either or both, a splice bar has in the past often made a tight jamming fit against surfaces of one rail while it has been unable to make an equally tight engagement with the opposing head and foot surfaces of the adjoining rail particularly at the rail end, due for example, to a difference at the abutting rail ends in the spacing between the bottom surface of the rail head and the top surface of the rail foot flange.

This imperfect fitting at one rail end has in turn resulted in a disadvantageous transverse play of one rail end with respect to the other, that has greatly aggravated wear at the relatively loose portion of the joint, so that the wear has progressively increased the difference of sectional contours of the abutting rail ends, greatly lessened the effectiveness of the joint, and has been a final determinant factor for the renewal of the rails, splice bars and track bolts.

Figure 4:
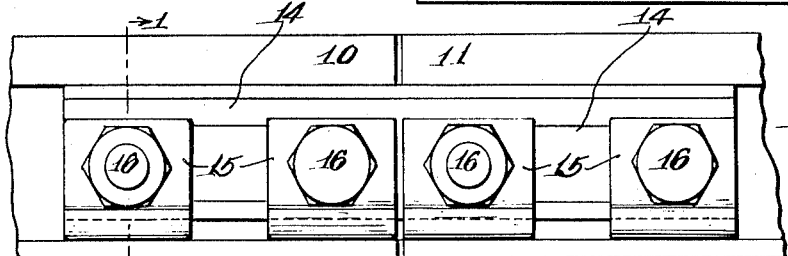
Figure 4 is a side elevation of Figure 1.

As illustrated in Figures 4 and 5 respectively, the wedge dog members may be mounted at each one of the track bolts (Figure 4), at only one of the track bolts, (Figure 5), or may be mounted at the two track bolts nearest the abutting rail ends, each construction having advantages as compared with either of the others. The wedges may cover each the half of a splice bar length abutting one rail end.

My invention is to considerable extent directed at correcting troubles arising from imperfect fitting of one or both rails with the splice bars. I eliminate wear between relatively loosely engaging surfaces by having the different supporting engagements equally tight, pressing supporting wedges between the opposing surfaces of the splice bar and rail.

Figure 1:
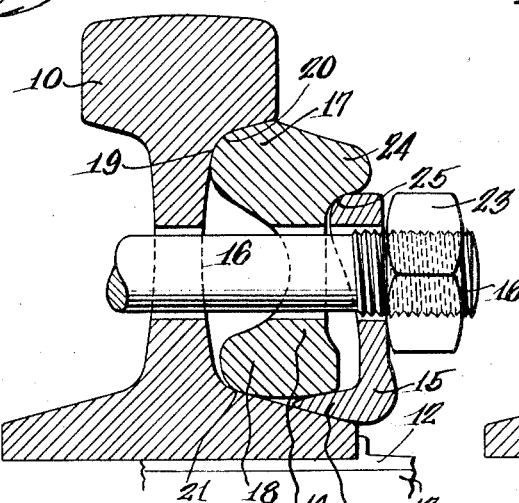

In the joint shown in Figures 1 and 4, the abutting ends of rails 10 and 11 supported upon tie plates 12 on ties 13 are spliced together by splice bars 14 on opposite sides of the rails, washer-wedge-dog members 15 and track bolts 16.

The splice bar 14 is shown with a head section 17 heavier than its foot section 18, and with an engagement surface 19 of the head fitting the contour of the under side of the rail head 20; both features however are immaterial to the present invention in that the head portion of the bar may be heavier or lighter than its foot portion and the inside of the head of the bar fit or fail to fit either the fillet of the rail head or the full length of the under side of the rail head beyond the fillet.

The bottom surface 21 of the splice bar foot has a portion that in a direction outward from the rail is of progressively increasing distance from the top surface of the rail flange, the opposing surfaces spreading to receive the wedge end 22 of the member 15, which is forced in by tightening the nut 23 of the track bolt.

When the splice bar is of uniform section throughout its length I may place a washer wedge-dog member 15 at each track bolt, as shown in Figure 4, the nut on each bolt being tightened to force the wedge portions 22 inwardly under the foot of the splice bar.

The splice bar 14 may be provided with an outwardly extending flange portion 24. This flange laterally stiffens the bar and also presents a fillet portion 25 that receives the upward thrust from the upper end of the member 15 which will then heavily press the head of the splice bar upwardly into the rail head when the bolt nut is tightened.

In practice the splice bars and rails have usually readily given a tight jamming fit at opposite ends of the splice bars and along one rail end but not along the other rail end, the bar fitting well with the rail end having the smaller distance between the downwardly directed surface on the bottom of the rail head and the upwardly directed surface of the rail flange and least well with the other rail at its entrance end where there is an abrupt difference, perhaps very small but sufficient to give a little play with a resultant progressively aggravated wear. The wear, in turn materially increases the difference.

I may give the splice bar a sectional contour to make a tight jamming fit at both its own ends and along all of the portion that is overlapping one rail, with a wedge adjustment and a different contour from the other rail end to a point beyond the rail-end track bolt, and have illustrated this in Figures 5 and 5ᵃ.

In Figures 1ᵃ, 2, 3, 5ᵃ, 5ᵇ and 8ᵃ the splice bars $14_1$, $14_2$, $14^3$, $14^4$, $14^5$ and $14^6$ may be of any usual or suitable sectional contour such as will adapt them to wedge directly between the opposing head and foot surfaces of the rail, except for a short distance at 26 from one rail end along the rail to a point somewhat beyond the rail-end track bolt $16_1$, where the surface of the splice bar is relieved to receive the wedge end 22 of the member 15. The relief to receive a wedge end may be in the slot as in Figure 5ᵇ or of a punched opening as in Figures 5ᵃ and 8ᵃ.

In Figure 5ᵇ the outside splice bar 14⁵ is additionally stiffened and the upper flange strengthened by a rib outside the rail and upon the upper surface of the flange.

The rail shown in Figure 5ᵃ has been shown as head free for the purpose of showing that my invention can be applied to various forms of common or special rail and splice bar sections of which this one rail section is merely one illustration.

It is advantageous when each splice bar has but a single wedge member to have the wedge member of one splice bar on the same track bolt as that of the other splice bar, see Figures 5 and 5ᵃ, as this permits the bolts 27, 28 and 29 to be tightened while the bolt 30 and wedge members 31 and 32 upon opposite sides of the rail joint are still loose.

In this way the splice bars are given a tight jamming fit everywhere except at the wedge members which are then properly adjusted by tightening the bolt 30.

The material of the dog member may be quite rigid or it may be such as to adapt it to yield resiliently without permanent strain.

In Figures 1, 2 and 3, the nut on the end of the track bolt has in each case not yet been tightened home and when this has been done, the body portion of the dog member or dog members can be deflected inwardly with a resilient dog to more nearly conform with the inside surface of the nut, and to approach the outside surface of the splice bar.

In the form shown in Figure 2 a splice bar $14_2$ is given a form to leave a flaring separation between the top 33 of the bar and the bottom 34 of the rail head and the dog member $15_1$ presents a wedge portion $22_1$ fitting into this flaring space.

The nut 23 on the track bolt presses the dog member inwardly in the same way as in Figure 1. The nut is shown not yet tightened home and when it is tightened, the body portion of the wedge dog can be made to flatten out to more nearly conform with the inside of the nut and the outside 35 of the bar when a resilient form is used.

The form shown in Figure 1 permits free use of any size and shape of bar head desired. That in Figure 2 sacrifices this but avoids interference of the wedge with any lateral foot extension 36 which may be permanently fastened down through the tie plate 12 by suitable spikes 37.

As in the form shown in Figure 1, I may provide the wedge dog members at each of the track bolts or at any desired number of the track bolts and the dog member may be individual to a single track bolt or be lengthened out and held by two or more of the bolts, as desired.

The greater the number of dog members along each splice bar the more adapted is it to accommodate local variations in contours at the different points along the bar.

In the form shown in Figure 3 I provide the splice bar with washer dog members $15_2$ and $15_3$ that present wedge portions $22_2$ and $23_3$ respectively both above and below the splice bar.

Except that the splice bars present at the wedge members surfaces suitably diverging from the opening surfaces of the rail or rails the splice bars may have widely variant contours.

As in the forms of Figures 2 and 3 the wedge members may be made of spring steel or other highly resilient material that is adapted to spring when the nuts are tightened without permanent deformation. The figure shows the construction before the nuts have been tightened and when the nuts have been tightened, the body portions of the wedge dog members will flatten out to more nearly fit the inside surface of the nut and the outside surface of the splice bar.

In Figure 7 I show the wedge members at each track bolt and the splice bar $14_3$ having a uniform contour throughout its length.

In Figures 8 and $8^a$ I show the wedge members at one rail end, as in Figures 5 and $5^a$.

As in the form of Figures 5 and $5^a$ the splice bar contour except at the wedges is such as to make a jamming fit between the opposing head and flange surfaces of the rail, and during installation the nuts 38, 39 and 40 away from the wedge members are preferably tightened while the wedge members and nut 41 are still loose.

The nut 41 is then tightened to properly force in the wedges and the wedges being provided at both top and bottom permit simultaneous accommodation to offsetting differences of rail-end contours at both the head and foot surfaces of the rails.

One material advantage of my joint is the greater solidity of the joint due to the springing of the body portions of the wedge dog members.

In practice, the amount of wear at any bearing surface becomes progressively very much greater when there is any progressive increase of relative movement between the engaging surfaces, and, my wedge joints, by eliminating all or a greater portion of the relative movement at the joints, greatly lessens wear at the bearing surfaces.

It will be evident that my splice bar joint is not suited to joints between the new rails only but is perhaps even more useful in application to joints between worn rail ends whether they have worn in the same setting with previous splice bars or whether they be worn rails relaid for other track service. With new rail construction the splice bars will usually be thus intended to accurately fit the rail contours, and my invention will be useful in accommodating them to rail ends of slightly different contour, either in shape or in spacing between the head and flange. This difference in rail contour or dimension may be unintentional, as occurs for example because of wear of rolls, or because of rolling different rails at different temperatures, or might be intentional as would occur where different rails or contours are deliberately fastened together.

With worn rails there is additional need of my invention in view of the fact that they may be worn to a contour for which there is no corresponding splice bar section.

It is my intention, therefore, to apply my invention both to new construction and to repair work.

In view of my invention and disclosure variations and modifications to meet individual judgment or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. In a splice bar joint between railroad rails, an apertured splice bar, an inwardly tightening wedge take-up between a surface of one of the rails and a surface of the splice bar and a flange upon the wedge extending from the wedge past one of the apertures in the splice bar to fulcrum upon the splice bar beyond the aperture and for passage of a splice bar bolt.

2. In a splice bar joint between railroad rails, a splice bar, a wedge member having its thicker part outwardly directed and presenting wedge engagement between opposing surfaces of the rail and splice bar respectively and a track bolt extending through the splice bar and holding the splice bar and rail and wedge member together.

3. In a splice bar joint between railroad rails, a splice bar, a wedge member presenting wedge engagement between opposing surfaces of the foot of the rail and of the splice bar and having the thick end of the wedge outwardly directed to tighten by movement toward the rail web and a splice bar bolt holding the members together.

4. In a splice bar joint between railroad rails, a splice bar, a wedge member presenting wedge engagement between opposing surfaces of the rail head and splice bar and having the heavy end of the wedge directed outwardly to tighten by movement toward the rail web and a splice bar bolt passing laterally through the rail web and holding the wedge member and splice bar to place against the rail.

5. In a splice bar joint between abutting ends of railroad rails, a splice bar, a plurality of track bolts fastening each rail end to the splice bar and a wedge take-up member mounted upon each track bolt and presenting wedge engagement between opposing surfaces of the splice bar and of the rails.

6. In a splice joint between abutting rail ends, a splice bar overlapping both rails, a plurality of track bolts fastening the splice bar to each rail end and a wedge member mounted on each track bolt, presenting wedge engagement between opposing surfaces of the splice bar and rail heads.

7. In a splice bar joint between abutting rail ends, a splice bar, a track bolt adjacent one rail end holding the bar to the rail and two wedge take-up members mounted on the track bolt, one making wedge engagement with the opposing surfaces of the rail head and splice bar and the other making wedge engagement with opposing surfaces of the rail foot and splice bar.

8. In a splice joint between railroad rails, a splice bar overlapping both rails and adapted to make engagements with the opposing surfaces of the head and foot portions of one of the rails for the length of the overlap and to make engagement with the head and foot portion of the other rail at the end of the splice bar and the splice bar having a contour presenting a surface flaring from an opposing surface of the rail from the rail end to a point beyond the rail end track bolt, and a wedge take-up member mounted upon the rail end track bolt.

9. In a rail joint, a pair of abutting rail ends, a pair of splice bars, one on each side of the rail ends and having respectively head and foot members, splice bar bolts and separate wedge members opposite the different rail ends and comprising wedge portions adapted to fit between the outer engaging parts of the splice bars and the rails, and flanges extending from the wedges past the splice bar bolts to fulcrum against the splice bars and to be tightened about this fulcrum by the splice bar bolts.

10. In a rail joint, a pair of abutting rail ends, apertured splice bars on opposite sides of the rail ends, each having head and foot members, splice bar bolts, a wedge having its thinner part toward the rail web, adapted to engage between the foot member of the splice bar and rail flange and a flange upon the wedge extending across the adjoining splice bar past the aperture to fulcrum against the head member of the splice bar and to be tightened about this fulcrum by a splice bar bolt.

11. In a rail joint for rails of slightly different sectional contour, the combination of a pair of abutting rail ends of different contour, a splice bar of uniform contour, a splice bar bolt and separate wedge means for suiting the splice bar contour to one of the rail ends as compared with the fit of the splice bar with the other rail, comprising an inwardly tapering wedge member fitting between the lower outer part of the splice bar and the rail flange, and a flange connected with the wedge extending across to fulcrum against the upper part of the splice bar and be forced to place by the splice bar bolt pressure upon the flange.

12. In a splice joint between abutting rail ends, a pair of rails having abutting ends, a pair of splice bars on opposite sides of the joint to be formed each having a head and foot member, one of the members predeterminedly sloping away from the adjoining surface of the rail head or rail flange as the case may be to form a space for a wedge member between the splice bar and rail, a splice bar bolt, a wedge member adapted to fit in this space and a flange upon the wedge member engaged by the bolt.

EUGENE W. CARUTHERS.